United States Patent

Oinoue et al.

[19]

[11] Patent Number: 6,044,048
[45] Date of Patent: Mar. 28, 2000

[54] OPTICAL PICKUP AND OPTICAL DISC DEVICE FOR ACCESSING MEDIA OF DIFFERING RECORDING DENSITIES

[75] Inventors: Hiroshi Oinoue, Tokyo; Tsutomu Mochizuki, Chiba, both of Japan

[73] Assignee: Sony Corporation, Japan

[21] Appl. No.: 08/785,549

[22] Filed: Jan. 21, 1997

[30] Foreign Application Priority Data

Jan. 24, 1996 [JP] Japan .................................. 8-029857

[51] Int. Cl.[7] .................................................. G11B 7/095
[52] U.S. Cl. .................................. 369/44.23; 369/44.37; 369/58; 369/44.41; 369/44.29
[58] Field of Search .............................. 369/44.26, 44.23, 369/44.41, 44.14, 44.29, 44.37, 54, 58, 44.27, 94

[56] References Cited

U.S. PATENT DOCUMENTS

| | | | |
|---|---|---|---|
| 4,779,255 | 10/1988 | Sugiyama et al. | 369/44.23 |
| 5,065,381 | 11/1991 | Takahashi | 369/44.23 |
| 5,235,583 | 8/1993 | Jongenelis et al. | 369/44.26 |
| 5,619,482 | 4/1997 | Tezuka et al. | 369/44.41 |
| 5,708,636 | 1/1998 | Takahashi et al. | 369/44.26 |

FOREIGN PATENT DOCUMENTS

| | | |
|---|---|---|
| 0727776 A1 | 8/1996 | European Pat. Off. . |
| 0742552 A2 | 11/1996 | European Pat. Off. . |

*Primary Examiner*—Thang V. Tran
*Attorney, Agent, or Firm*—Rader, Fishman & Grauer; Ronald P. Kananen

[57] ABSTRACT

An optical pickup in an optical disc device configured for recording and/or reproducing signal on or from an optical disc. The optical pickup is configured for setting the orientation of a bending mirror directing the optical path of a light beam radiated from a light source towards the optical disc so that the optical path between the reflecting surface of the mirror and the photodetector is approximately 45 relative to the recording track of the optical disc. With the above configuration of the optical pickup, focusing error signals and tracking error signals of plural discs of different types can be detected by a common photodetector.

29 Claims, 14 Drawing Sheets

OPTICAL PICKUP AND OPTICAL DISC DEVICE FOR ACCESSING MEDIA OF DIFFERING RECORDING DENSITIES

BACKGROUND OF THE INVENTION

1. Field of the Invention

This invention relates to an optical pickup and an optical disc device for recording and/or reproducing signals on or from an optical disc, such as a compact disc (CD) or a CD-ROM, or a magneto-optical disc or phase-transition optical disc (termed collectively as an optical disc). More particularly, it relates to an optical pickup and an optical disc device configured for reproducing plural types of optical discs having different disc formats.

2. Description of the Related Art

Heretofore, an optical pickup for reproducing an optical disc is made up of a semiconductor laser element, as light emitting means, an objective lens for radiating the light from the semiconductor laser element to the optical disc, a biaxial actuator for holding the objective lens for movement in two directions, a photodetector for detecting the return light from the optical disc and a servo circuit for driving the objective lens of the biaxial actuator in both the focusing and tracking directions in a controlled manner.

With the above optical pickup, a light beam from a light source is radiated onto a signal recording surface of an optical disc, and the return light reflected from the signal recording surface is received by a light receiving surface of the photodetector for detecting recording signals.

For correctly detecting playback signals, it is necessary for the light beam from the light source to form a light spot at a correct position on the signal recording surface of an optical disc. To this end, movement of the objective lens of the optical pickup for condensing the light from the light source on the signal recording surface of the optical disc is controlled on the basis of pre-set servo signals.

The objective lens is servo-controlled by tracking servo of moving the objective lens along the radius of the optical disc with respect to the recording tracks on the optical disc and by focusing servo of moving the objective lens in a direction towards and away from the signal recording surface of the optical disc along the optical axis.

The tracking servo system may be classified into a three-spot method in which the light beam is split into three sub-beams and both side sub-beams, and a phase comparison method in which the phase difference of the return light to a four-segment photodetector is detected, as described in U.S. Pat. No. 4,785,441.

As the focusing servo system, there is known an astigmatic method in which astigmatic aberration of a light beam is detected by a photodetector divided into four segments in the vertical and horizontal directions for detecting the focusing error.

Meanwhile, attempts are being made towards raising the recording density of the optical disc as an auxiliary storage device for a computer and as a package medium for the speech and video information. If the conventional optical disc is termed a first sort of the optical disc, it is envisaged with the second type of the optical disc, proposed for realizing high recording density, to reduce the distance between recording tracks of the optical disc for realizing high recording density.

However, if it is desired to reproduce the first type of the optical disc, as the conventional optical disc, and the second type of the optical disc, having the disc format different form that of the first type of the disc, by the same optical pickup, it may be feared that any sole servo system is not sufficient.

If assumed that the above-mentioned three-spot method is used for tracking servo, the spacing between recording tracks becomes narrower with the second type of the optical disc than with the first type of the optical disc, such that the relative position between the spot of the side beam and the track is changed and hence there arises the risk that the tracking signal cannot be produced by the three-spot method.

Similarly, with the phase comparison method, the risk arises that the tracking error signal produced is not optimum since the spacing between recording tracks differs with different disc formats.

SUMMARY OF THE INVENTION

It is therefore an object of the present invention to provide an optical pickup in which the tracking error signal and the focusing error signal are obtained on the basis of a signal derived from the light receiving segments of a common photodetector for correctly reproducing optical discs of different formats, and an optical device employing this optical pickup.

In one aspect, the present invention provides an optical pickup device including a light source for radiating a light beam, a light splitting element for splitting a light beam radiated by the light source into at least three light beam portions, an optical path bending mirror for bending the optical paths of the light beam portions bent by the light splitting element, an objective lens for radiating the light beam portions from the optical path bending mirror so as to be focused on a signal recording surface of the optical disc, a biaxial actuator for supporting the objective lens and for moving the objective lens in the focusing direction and in the tracking direction relative to the optical disc, light splitting means for splitting the light beam radiated from the light source to the optical disc from a return light beam reflected from a signal recoding surface of the optical disc and the optical path of which has been bent by the optical path bending mirror, and a photodetector for receiving the return light beam split by the light splitting means. The photodetector has three light receiving units for receiving the three light beam portions split by the light splitting element. The optical paths from the light splitting means to the optical path bending mirror is set at an angle of approximately 45° relative to the direction of the recording track of the optical disc. During reproduction of a first optical disc, the photodetector detects focusing error signals and tracking error signals by a light receiving element disposed at the center of the three light receiving elements and by the remaining two light receiving elements, respectively. On the other hand, during reproduction of the second optical disc, the photodetector detects focusing error signals and tracking error signals by the light receiving element disposed at the center of the three light receiving elements.

In another aspect, the present invention provides an optical disc device for recording and/or reproducing signals on or from an optical disc including driving means for rotationally driving an optical disc, discriminating means for discriminating optical disc types, an optical pickup for radiating a light beam for recording and/or reading out the signals, and transfer means for transferring the optical disc device along the radius of the optical disc. The optical disc device further includes a light source for radiating a light beam, a light splitting element for splitting a light beam radiated by the light source into at least three light beam portions, an optical path bending mirror for bending the optical paths of the light beam portions bent by the light splitting element, an objective lens for radiating the light beam portions from the optical path bending mirror so as to be focused on a signal recording surface of the optical disc, a biaxial actuator for supporting the objective lens and for moving the objective lens in the focusing direction and in the tracking direction relative to the optical disc, light splitting means for splitting the light beam radiated from the light source to the optical disc from a return light beam reflected from a signal recording surface of the optical disc and the optical path of which has been bent by the optical path bending mirror, and a photodetector for receiving the return light beam split by the light splitting means. The photodetector has three light receiving units for receiving the three light beam portions split by the light splitting element. The optical paths from the light splitting means to the optical path bending mirror is set at an angle of approximately 45 degrees relative to the direction of the recording track of the optical disc. During reproduction of a first optical disc, the photodetector detects focusing error signals and tracking error signals by a light receiving element disposed at the center of the three light receiving elements and by the remaining two light receiving elements, respectively. On the other hand, during reproduction of a second optical disc, the photodetector detects focusing error signals and tracking error signals by the light receiving element disposed at the center of the three light receiving elements.

According to the present invention, as described above, the tracking error signals by the phase comparison method and the focusing error signal by the astigmatic method are obtained on the basis of the split light receiving segments of the photodetector for enabling correct reproduction of different types of optical discs.

DESCRIPTION OF THE PREFERRED EMBODIMENTS

Referring to FIGS. 1 through 17, preferred embodiments of the present invention will be explained in detail.

These embodiments, described hereinbelow, represent preferred embodiments of the present invention and hence are placed upper various technically desirable limitations. However, the scope of the present invention is not limited by these merely illustrative embodiments in the absence of statements to the contrary.

Figure 1:
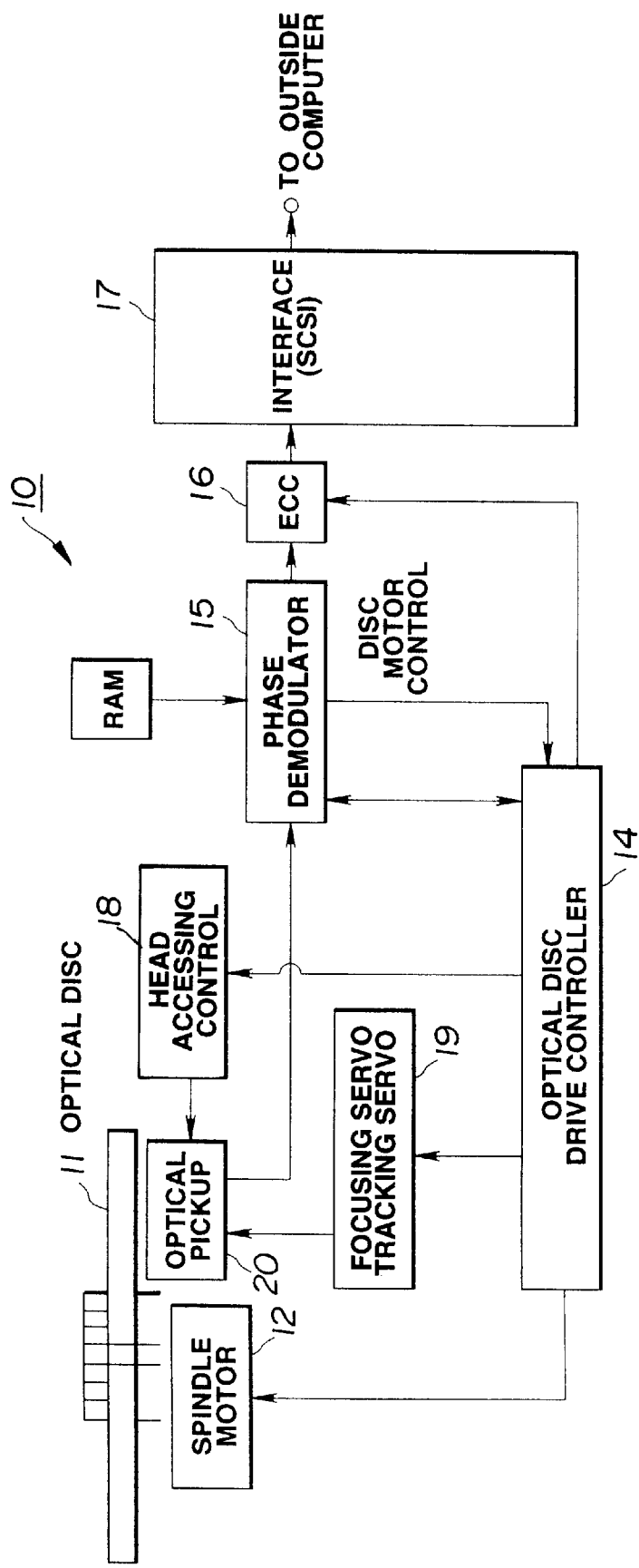
FIG. 1 is a block diagram showing an overall structure of an embodiment of an optical disc device having built therein an optical pickup according to the present invention.

FIG. 1 shows an embodiment of an optical pickup having built therein an optical pickup according to the present invention.

In FIG. 1, an optical disc device 10 includes a spindle motor 12, as driving means for rotationally driving an optical disc 11, and an optical pickup 20.

The spindle motor 12 is driven in a controlled manner by an optical disc driving controller 14 so as to be rotated at a pre-set rpm.

The optical pickup 20 is configured for selecting plural type of different optical discs for reproducing the selected optical disc.

The optical pickup 20 radiates light on a signal recording surface of the rotated optical disc 11, while outputting a playback signal derived from the return light to a signal demodulator 15 for detecting the return light from the signal recording surface.

The recording signal demodulated by the signal demodulator 15 is corrected for errors by an error correction circuit 16 and sent via an interface 17 to, for example, an external computer configured for receiving the signal recorded on the optical disc 11 as a playback signal.

To the optical pickup 20 is connected a head accessing controller 18 for moving the optical pickup as far as a pre-set recording track on the optical disc 11. To the optical pickup 20 is also connected a servo circuit 19 for causing a biaxial actuator holding the objective lens of the optical pickup 20, as later explained, to move the objective lens in the focusing and tracking directions.

Figure 2:
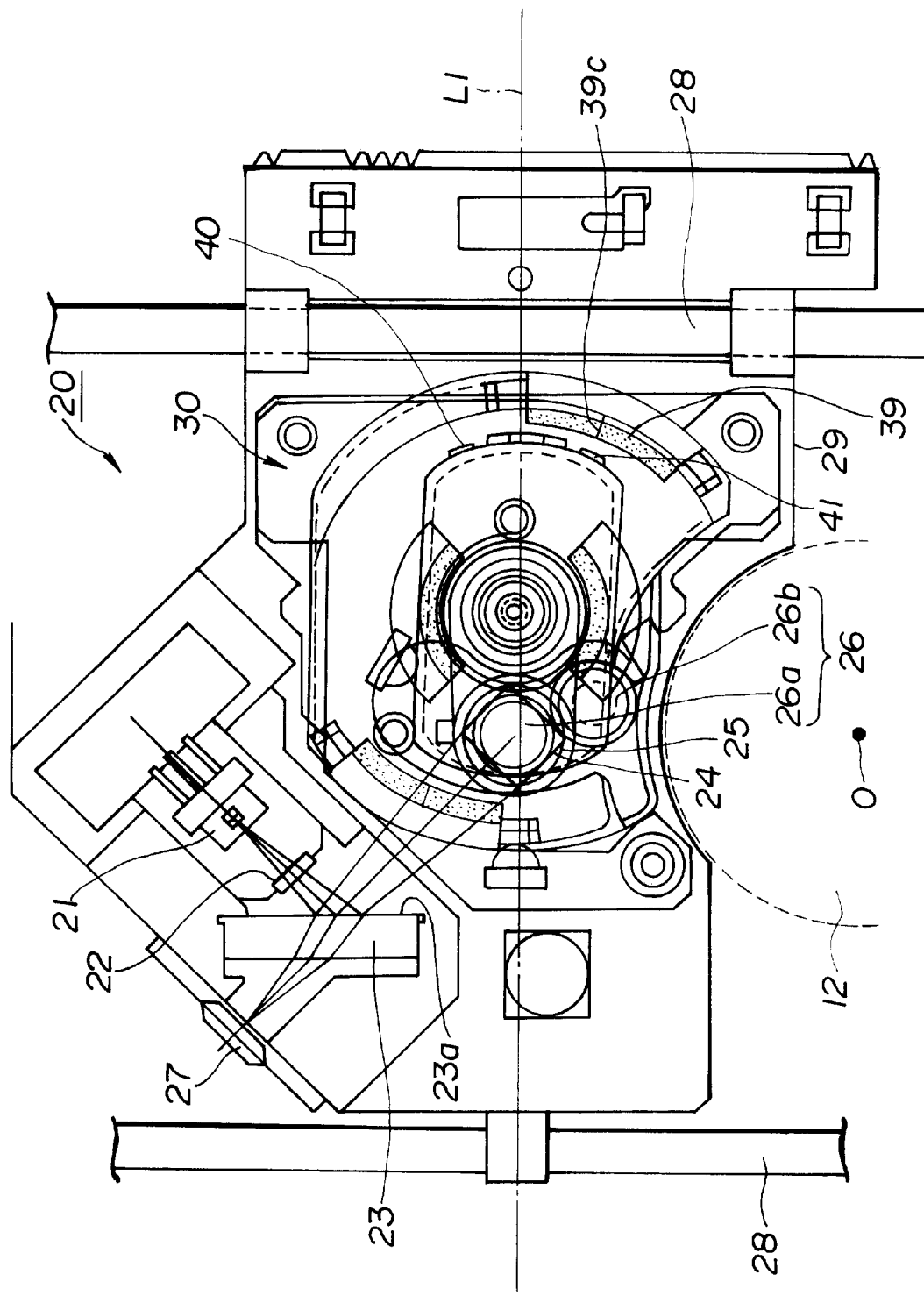
FIG. 2 is a plan view showing the structure of an optical pickup in the optical disc device shown in FIG. 1.
Figure 3:
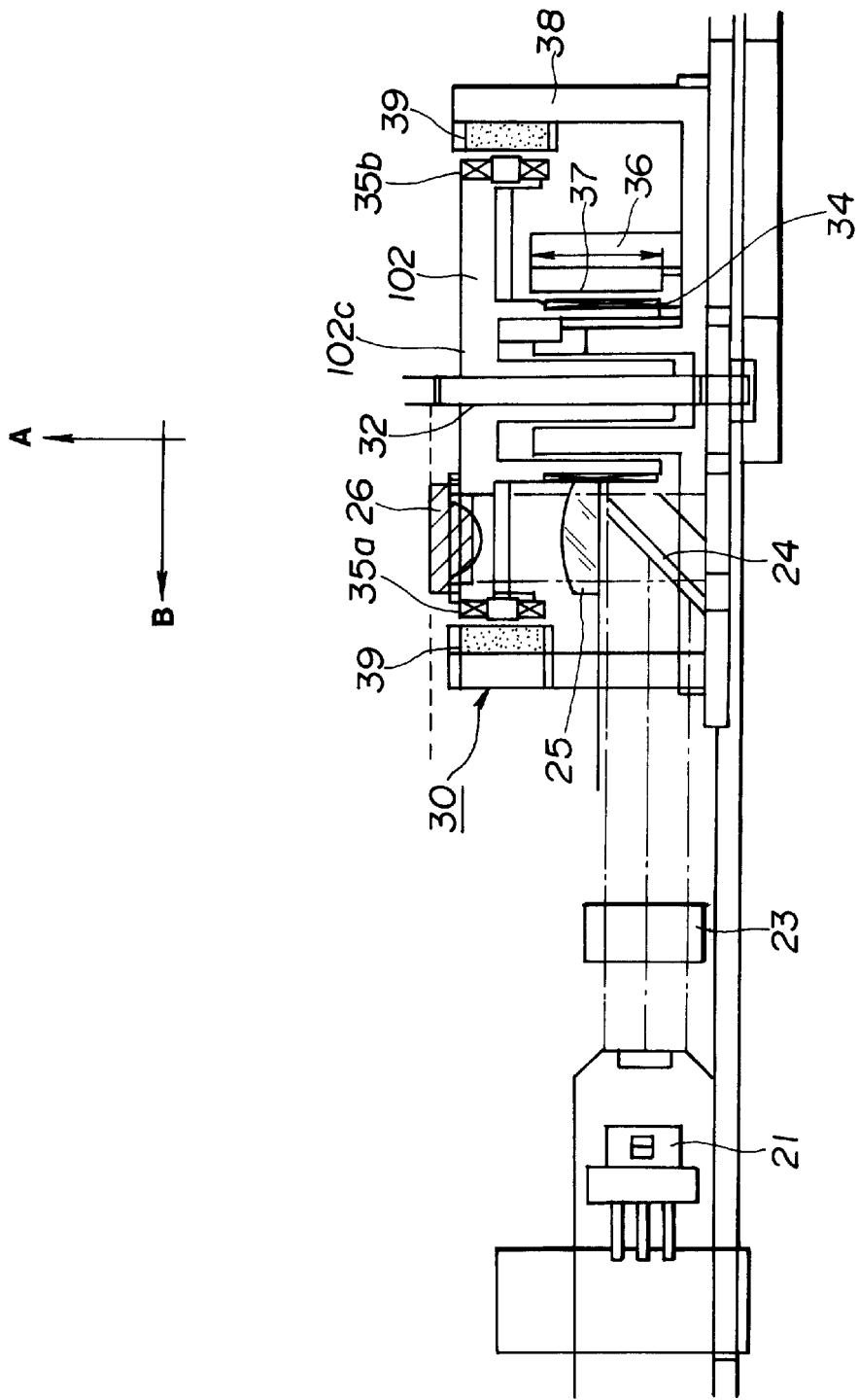
FIG. 3 is a longitudinal cross-sectional view of the optical pickup shown in FIG. 2, looking from a semiconductor laser element towards the objective lens via a raising mirror and a collimator lens.

FIGS. 2 and 3 show an example of the optical pickup 20 built into the optical disc device 10.

In FIGS. 2 and 3, the optical pickup 20 is made up of a semiconductor laser element 21, a grating 22 as light dividing means, a beam splitter 23 as light splitting means, a raising mirror 24, a collimator lens 25, an objective lens 26, a photodetector 27 and a biaxial actuator 30 for moving the objective lens 26 in two directions.

The semiconductor laser element 21 is a light-emitting element exploiting recombinant light emission of a semiconductor and is used as a light source. The light beam radiated from the semiconductor laser element 21 is conducted to the grating 22.

The grating 22 is a diffraction lattice for diffracting the incident light and is used for dividing the light beam outgoing from the semiconductor laser element 21 into at least three light beams, namely a main light beam consisting in the zero order diffracted light and two side beams consisting in Π one order diffracted light. Thus the grating may be replaced by the light dividing elements, such as a hologram element, provided that the light beam can thereby be divided into at least three light beams.

The beam splitter 23 is arranged with its reflecting surface 23a inclined 45° relative to the optical axis and splits the light beam from the grating 22 from the return light from the signal recording surface of the optical disc 11. That is, the light beam from the semiconductor laser element 21 is reflected by the reflecting surface 23a of the beam splitter 23, with the return light being transmitted through the beam splitter 23.

Figure 4:
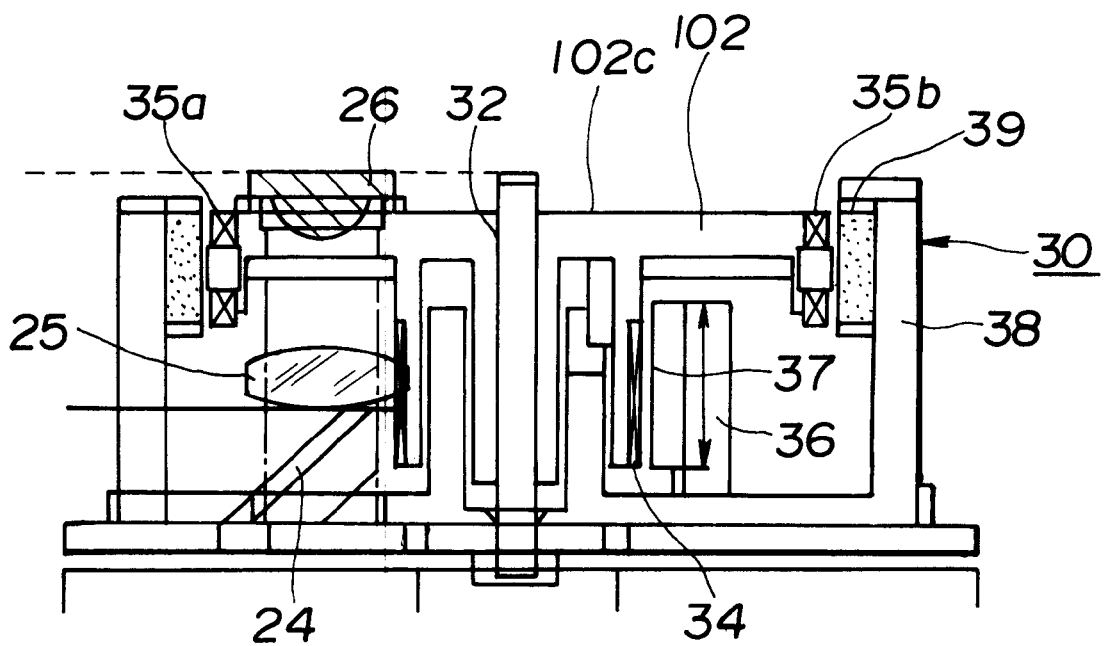
FIG. 4 is a cross-sectional view showing a biaxial actuator in the optical pickup of FIG. 2.

The raising mirror 24 is a optical path bending means, as shown in FIGS. 3 and 4. That is, the raising mirror 24 reflects the light beam, reflected by the beam splitter 23, by 90° towards above, that is in a direction shown by arrow A in FIG. 3, while reflecting the return light from the optical disc 11 in the horizontal direction, that is in a direction shown by arrow B in FIG. 3.

The raising mirror 24 is mounted so that the direction of inclination thereof is 45° relative to the track direction of the optical disc 11, that is to the tangential direction of the track shown by a chain-dotted line L1 in FIG. 2.

Figure 14:
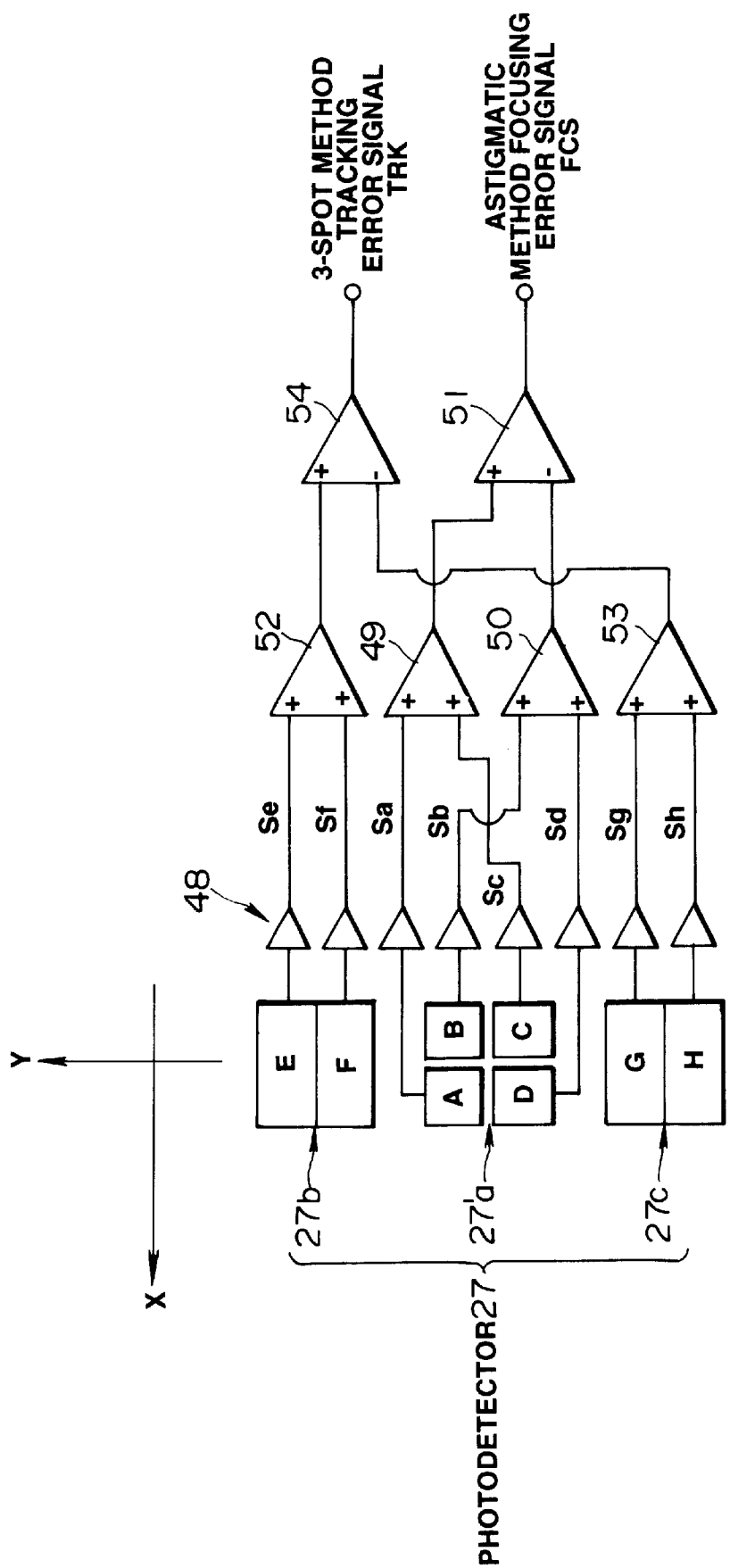
FIG. 14 is a circuit diagram showing the structure of a tracking error detection circuit in case of reproduction of the first type of the optical disc in the optical pickup of FIG. 2.
Figure 15:
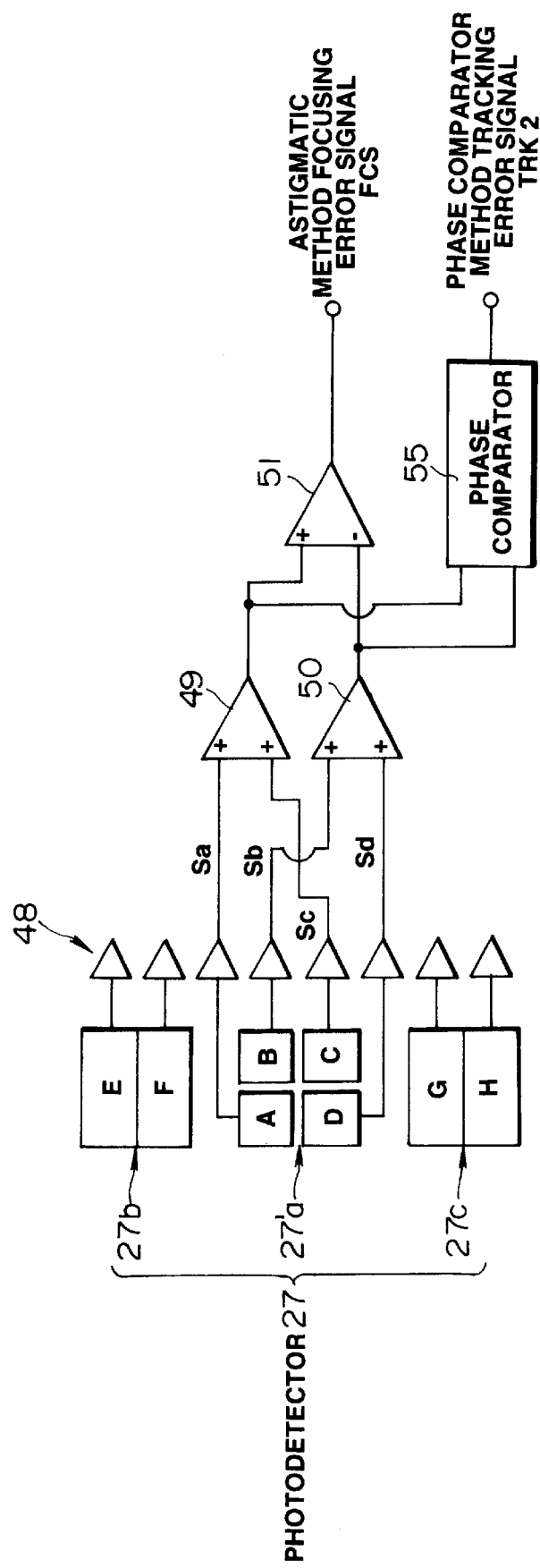
FIG. 15 is a circuit diagram showing a typical structure of a tracking error detection circuit in case of reproduction of a high recording density optical disc in the optical pickup of FIG. 2.

With the above-described arrangement, the focusing error signal and the tracking error signal are detected by the astigmatic method and by the phase comparison method by a first light receiving unit divided into four segments in the horizontal and vertical directions, as shown in FIGS. 14 and 15.

The collimator lens 25 is a convex lens, as shown in FIGS. 3 and 4, and collimates the light beam reflected by the raising mirror 24 into a collimated light beam.

In this case, the collimator lens 25 is placed in a optical path bent by the raising mirror 24, that is in a optical path perpendicular to the signal recording surface of the optical disc. Since the spacing between the beam splitter 23 and the raising mirror 24 is selected in this manner to a smaller value, the biaxial actuator 30 and hence the optical pickup 20 and the optical disc device 10 may be rendered compact. In addition, since the collimator lens 25 is arranged between the objective lens 26 and the raising mirror 24, a supporting shaft 32 for a lens holder 32 may be of a longer length, thus enabling the lens holder 33 to be held in stability.

Figure 5:
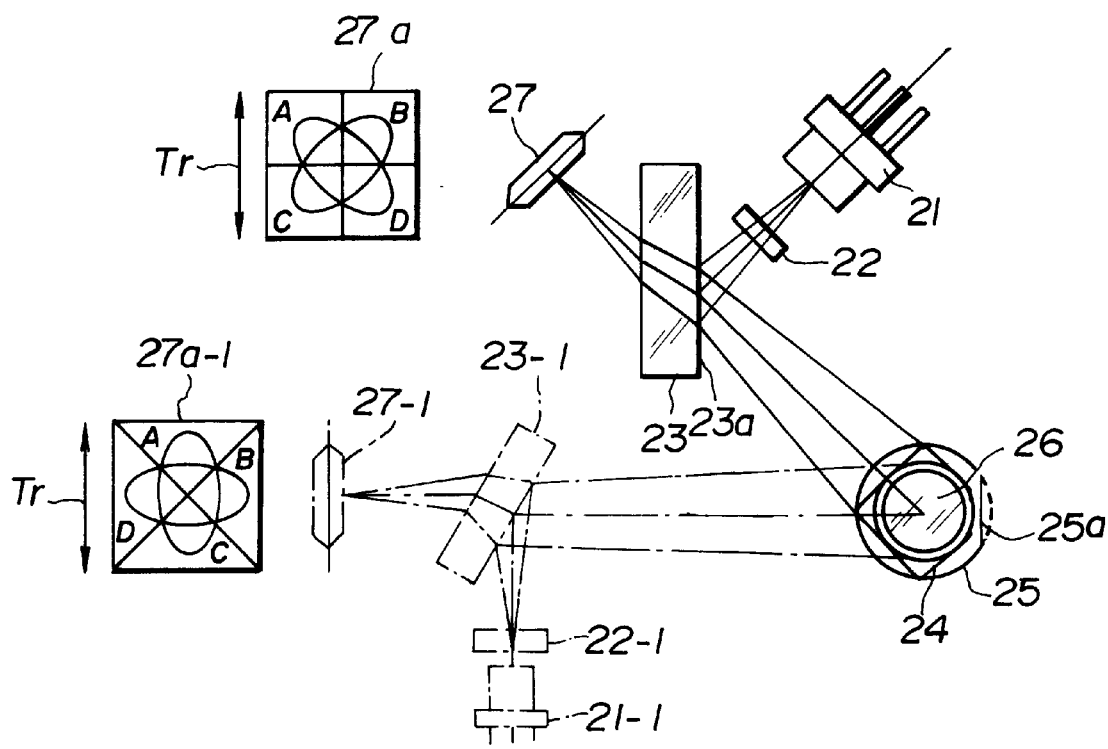
FIG. 5 is a plan view showing an optical system in the optical pickup shown in FIG. 2.

The collimator lens 25 has its lateral edge towards the shaft 32 cut as shown at 25a as shown in FIG. 5 for avoiding possible conflict of the collimator lens with a focusing coil 34, a focusing yoke 36 or a focusing magnet 37. The tracking operation, for example, is not affected by such cutting at 25a since a sufficient length of the collimator lens 25 can be assured in the track direction of the optical disc 11.

The objective lens 26 is a convex lens, as shown in FIGS. 3 and 4, and condenses the collimated light from the collimator lens 25 in a desired track on the signal recording surface of the rotating optical disc 11.

The objective lens 26 is made up of two objective lenses 26a, 26b designed for coping with two type of optical discs having different disc structures. The objective lens 26 is supported by a axial sliding rotating type biaxial actuator 30 for movement in two axial directions, that is in a focusing direction and in a tracking direction. In addition, the objective lens is supported by the lens holder, as a movable portion of the biaxal actuator 30, for being alternatively introduced into the optical path, as will be explained subsequently.

Figure 6:
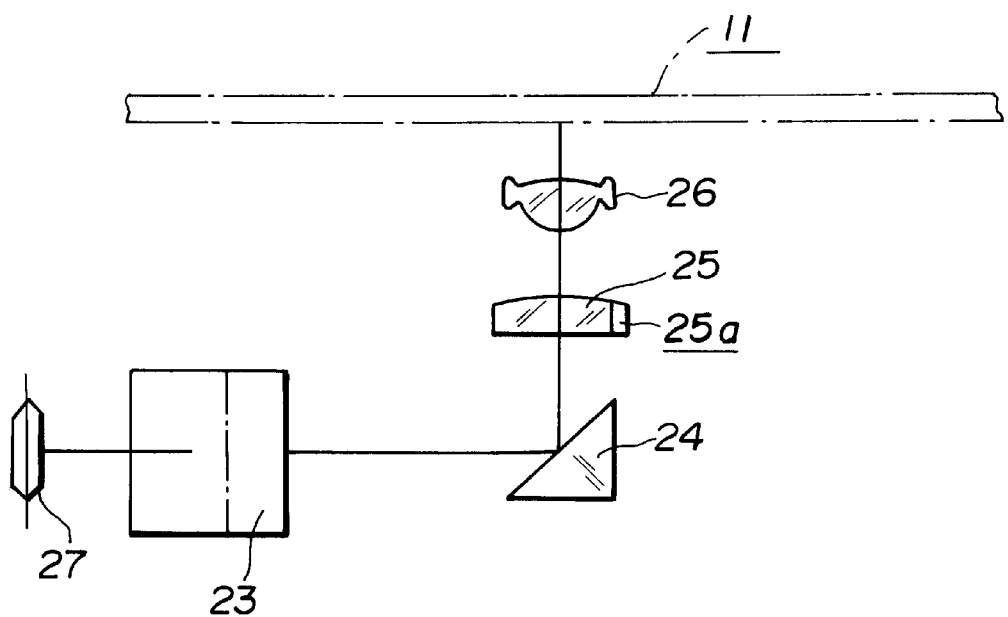
FIG. 6 is aside view showing the optical system in the optical pickup shown in FIG. 2.

The photodetector 27 is configured for having a light receiving portion for the return light beam transmitted through the beam splitter 23, as shown in FIGS. 5 and 6. The photodetector 27 is arranged so that the light receiving surface thereof is arrayed at right angles with the signal recording surface of the optical disc 11.

The structure of the segmented light receiving unit of the photodetector 27 is shown in FIGS. 14 and 15.

The semiconductor laser element 21, grating 22, beam splitter 23, raising mirror 24, collimator lens 25 and the photodetector 27 are mounted fixedly on a biaxial base 31 which is a stationary portion of the biaxial actuator 30.

Figure 7:
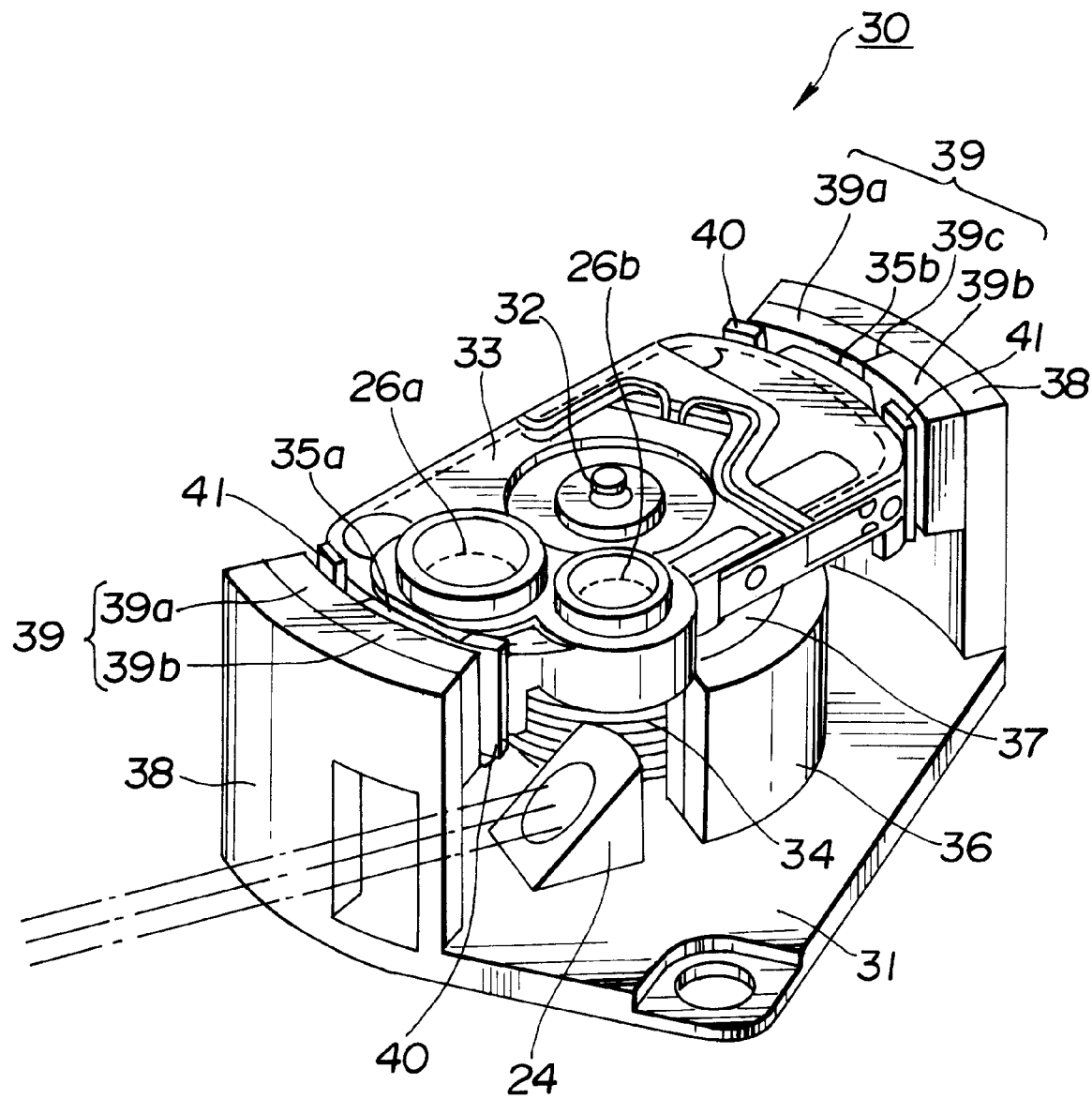
FIG. 7 is a perspective view showing a biaxial actuator in the optical pickup of FIG. 2.
Figure 8:
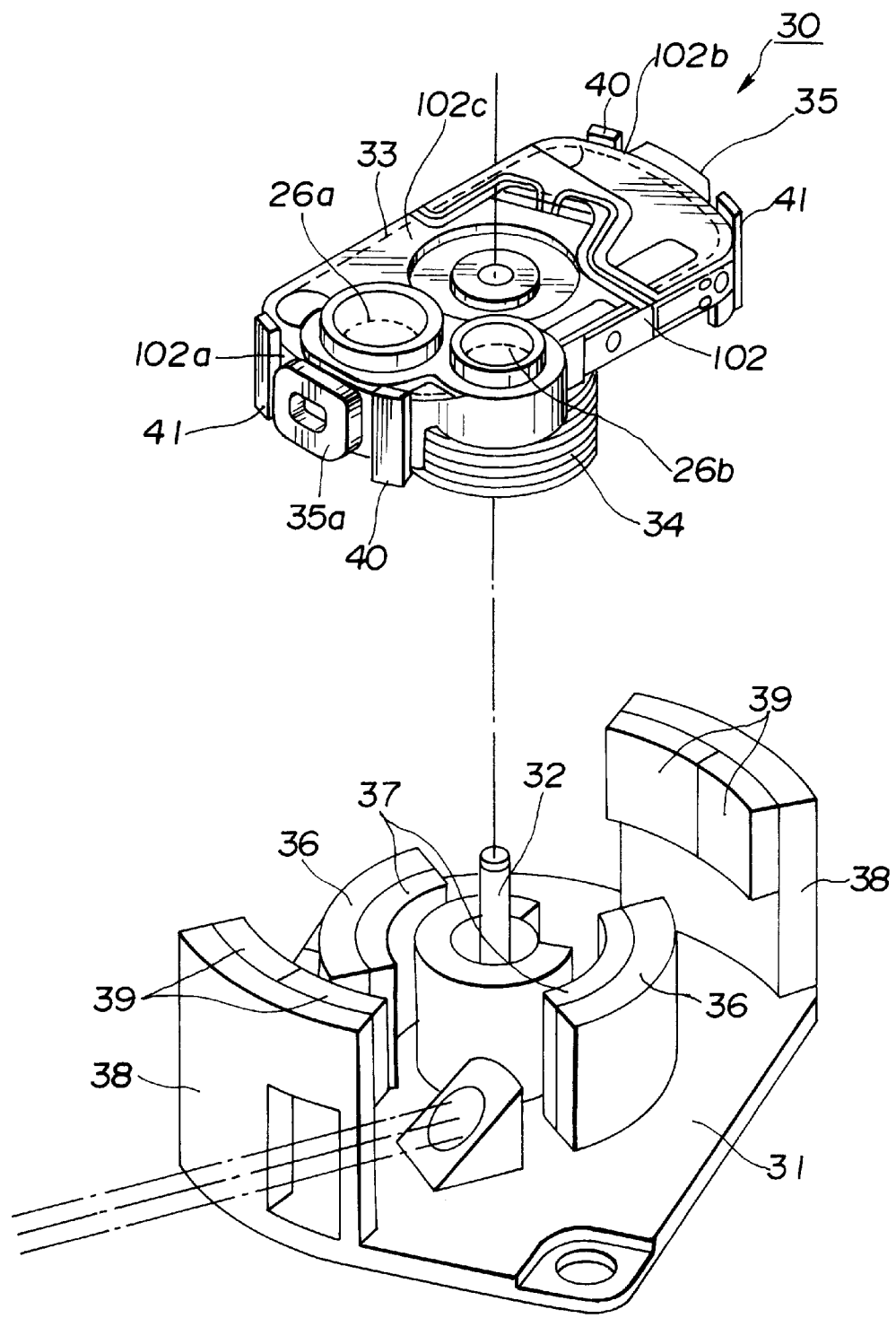
FIG. 8 is an exploded perspective view of the biaxial actuator shown in FIG. 7.

FIGS. 7 and 8 illustrate the structure of the biaxial actuator 30.

Referring to FIGS. 7 and 8, the biaxial actuator 30 includes the biaxial base 31, mounted in a skew adjusted state on an optical base 29 supported for movement radially of the optical disc 11 along a guide 28 by the optical pickup 20 of FIG. 2, and the supporting shaft 32 extending upright on the biaxial base 31. The biaxial actuator also includes the elliptical or rectangular lens holder 33 and the objective lenses 26a, 26b. The lens holder is supported by the supporting shaft 32 for movement along and for rotation about the axis thereof, while the two objective lenses are placed at pre-set distances from the rotational axis for the lens holder and at different angular positions with the optical axes of the lenses lying parallel to the supporting shaft.

The objective lens 26a is the second type optical disc having the recording density higher than that of the first type optical disc and having a larger value of the numerical aperture NA for the high-density optical disc, such as NA=0.6. The objective lens 26a is of a diameter larger than the first type optical disc, such as CD, with a smaller numerical aperture (such as NA=0.45). The objective lens 26b of the smaller diameter is arranged towards the center of rotation of the optical disc 11.

The lower half of the lens holder 33 is formed with a cylindrical portion 101 concentric with the supporting shaft 32, while the upper half thereof is formed with a flange 102 in the form of a flat plate having an upper surface 102c parallel to the signal surface of the optical disc 11 and lateral sides 102a, 102b perpendicular to the signal surface.

The objective lenses 26a, 26b are arranged on the upper surface 102c of the flange 102 of the lens holder 33. The objective lens 26b with the smaller diameter is arranged at a position proximate to the center of rotation of the optical disc 11.

On the cylindrical portion 101 of the lower half of the lens holder 33 is mounted the focusing coil 34. On the lateral sides 102a, 102b of the flange 102 of the upper half symmetrical relative to the supporting shaft 32 are mounted a pair of tracking coils 35a, 35b.

On the biaxal base 31 of the biaxial actuator 30 are mounted a pair of focusing yokes 36, 36 and a pair of tracking yokes 38, 38 at such positions as not to obstruct the optical path of the light beam radiated from the semiconductor laser element 21. The focusing yokes 36, 36 are mounted facing the focusing coil 34 from the outer side of the cylindrical portion 101 symmetrically with respect to the supporting shaft 32, while the tracking yokes 38, 38 are arranged facing the outer sides of the tracking coils 35a, 35a.

On the inner sides of the focusing yokes 36, 36 and the inner sides of the tracking yokes 38, 38, there are mounted a pair of focusing magnets 37, 37 and a pair of tracking magnets 39, 39, respectively.

In this manner, the tracking coils 35a, 35b are mounted on both ends of the flange 102 of the lens holder 33 for generating the electromagnetic driving force of equal magnitude at each end of the elongated flange 102 of the lens holder 33 rotated about the supporting shaft 32 as the center of rotation. This permits the lens holder 33 to perform smooth rotation.

In the lens holder 33 of the present embodiment, the raising mirror 24 is placed below the flange 102 side-by-side relative to the focusing coil.

The focusing coil 34 is wound about the outer periphery of the cylindrical portion 101, independently of the tracking coils 35a, 35a. The focusing coil is placed at a position closer to the peripheral surface of the supporting shaft 32 and is of a smaller diameter.

The focusing coils 36 and the magnets 37 are similarly mounted at positions closer to the supporting shaft 32. Thus the focusing coil 34 is small in size as a whole with an increased effective conductor length.

Figure 9:
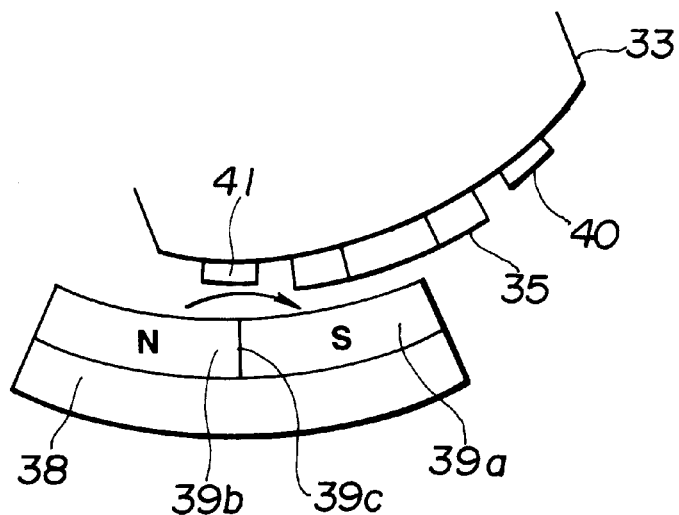
FIG. 9 is a schematic plan view showing a magnetic circuit at a first neutral point position of a lens holder in the biaxial actuator shown in FIG. 7.
Figure 10:
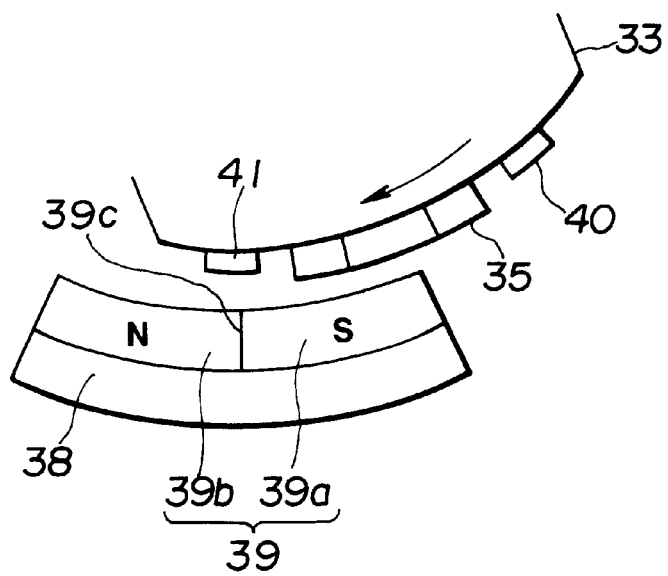
FIG. 10 is a schematic plan view showing the state of movement from the first neutral point position to a second neutral pont position of the lens holder in the biaxial actuator shown in FIG. 7.

The tracking magnets 39, 39 are magnetized to opposite polarities in the circumferential direction with the axial center of the supporting shaft 32. For example, the tracking magnet 39 is magnetized in the circumferential direction to an S pole 39a and a N pole 39b clockwise about the supporting shaft 32, as shown in FIG. 9.

Each of the tracking coils 35a, 35b has a winding portion extending parallel to the axial direction of the supporting shaft 32. On both sides of the winding portion, there are mounted on the lateral sides 102a, 102b magnetic members, such as iron pieces 40, 41, extending axially of the supporting shaft 32. By the iron pieces 40 or 41 being magnetically attracted by the tracking magnet 39 for facing a boundary portion 39c between the magnetic poles 39a, 39b of the tracking magnet 39, the lens holder 33 is moved to a first neutral point position in which the first objective lens 26a is introduced into the optical path between the signal recording surface of the optical disc 11 and the collimator lens 25 or to a second neutral point position in which the second objective lens 26b is introduced into the above-defined optical path.

The lateral sides 102a, 102b of the lens holder 33 are arranged symmetrically relative to the supporting shaft 32. The tracking coils 35a, 35b and the iron pieces 40, 41 are arranged on the lateral sides 102a, 102b symmetrically relative to the supporting shaft 32, respectively.

With the above-described arrangement, the objective lenses 26a, 26b are selectively introduced into the optical path defined between the semiconductor laser element 21 and the signal recording surface of the optical disc 11.

By appropriately changing the size and/or the shape of the iron pieces 40, 41, the force of magnetic suction by the tracking magnets 39 may be varied for appropriately setting the first-order resonant frequency $f_o$ of the biaxial actuator 30.

By the iron pieces 40, 41 being attracted by the tracking magnet 39, the lens holder 33 may be designed to be thrust against a lateral side of the supporting shaft 32 for deceasing the flutter attributable to the interstice between the lens holder 33 and the supporting shaft 32.

In FIG. 7, the lens holder 33 is shown positioned intermediate between the first and second neutral point positions.

If the objective lens 26a, for example, is introduced into the optical path, the iron piece 41 faces the boundary 39c of the magnetic poles 39a, 39b of the tracking magnet 39, as shown in FIG. 9. At this time, the lens holder 33 is at the first neutral point position and is maintained thereat by the magnetic flux flowing in a direction as shown by arrow in FIG. 9. If the driving current flows through the tracking coils 35a, 35b in the direction shown by arow K or L in FIG. 11, the lens holder 33 is oscillated about the supporting shaft 32, as shown by arrows p, q in FIG. 11, with the first neutral point position as a reference. The objective lens 26a is moved in the tracking direction or in a tangential direction relative to the rotation of the lens holder 33 for tracking.

Figure 11:
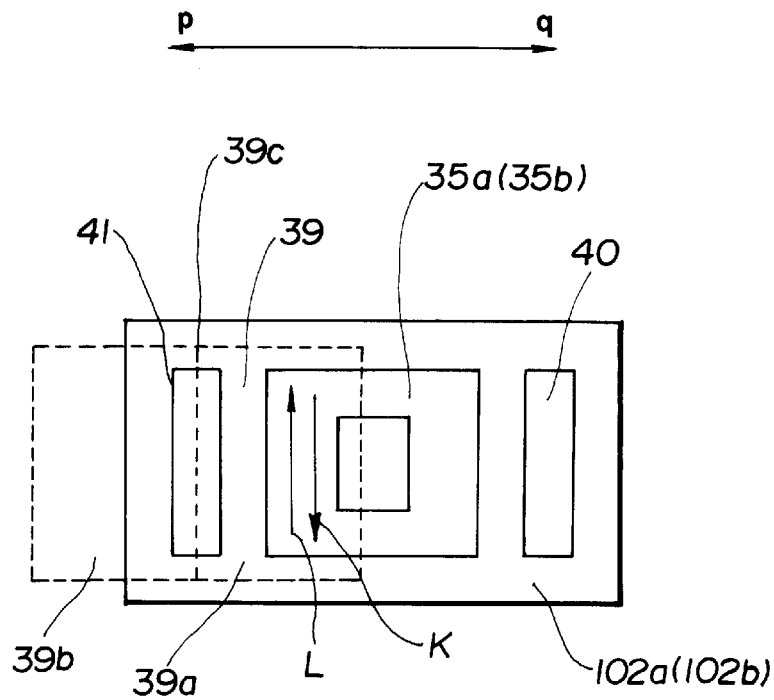
FIG. 11 is a side view at the first neutral point position of the lens holder in the biaxial actuator.
Figure 12:
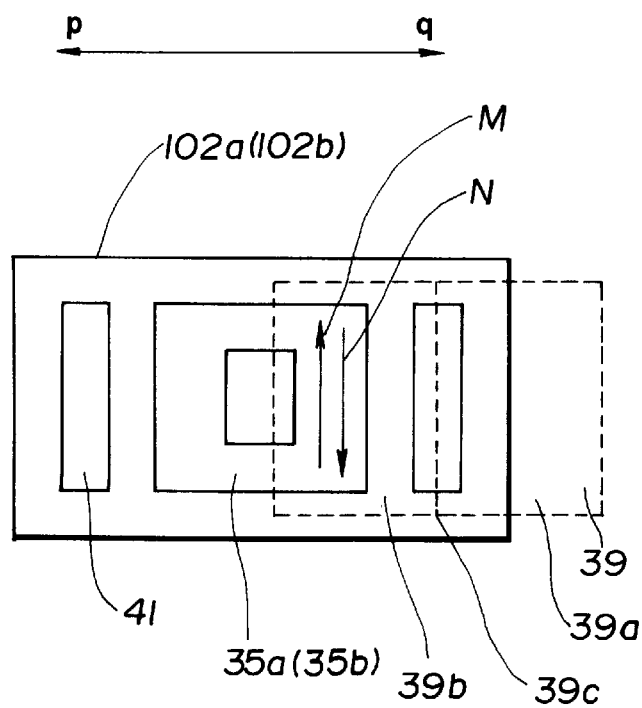
FIG. 12 is a side view at the second neutral point position of the lens holder in the biaxial actuator.

If a current larger than that flowing during usual tracking servo is caused to flow in the tracking coils 35a, 35b in a direction shown by arrow L in FIG. 11, the magnetic field from the tracking magnet 39 acts strongly on the tracing coils 35a, 35b in a direction shown by arrow p in FIG. 11, with the tracking coils 35a, 35b being moved so as to face the magnetic pole 39b. This causes the opposite side iron piece 40 to face the boundary portion 39c of the magnetic poles 39a, 39b, as shown in FIG. 12. Thus the lens holder 33 is moved to the second neutral point position, with the objective lens 26b being introduced into the optical path.

Figure 13:
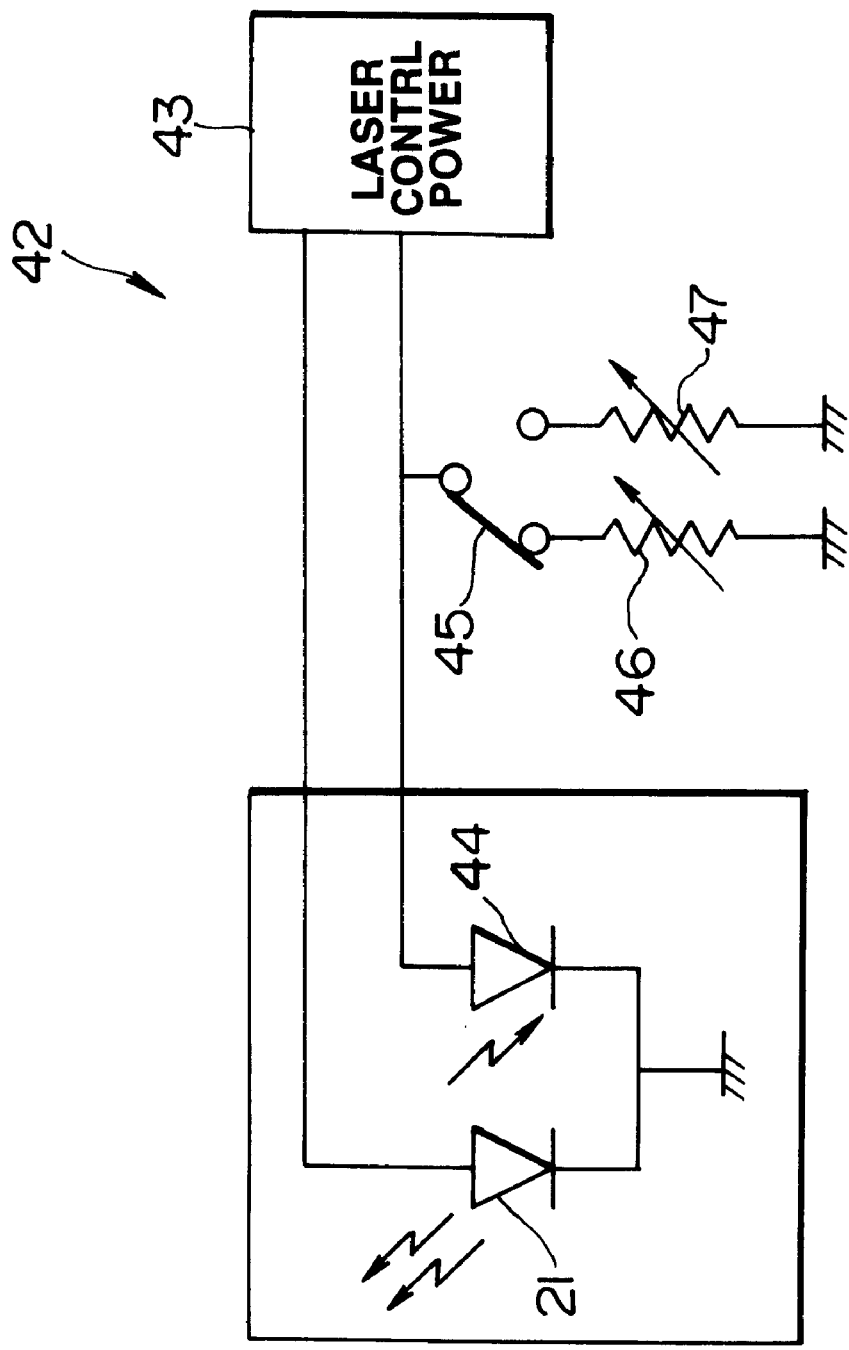
FIG. 13 is a circuit diagram showing the structure of a laser light adjustment device for a semiconductor laser element in the optical pickup of FIG. 2.

The semiconductor laser element 21 is adjusted by a laser light adjustment circuit 42 so that an output power thereof is set to an optimum light volume by the photodetector 27 depending on the type of the optical disc to be reproduced, as shown in FIG. 13.

In FIG. 13, the laser light adjustment circuit 42 includes a laser control power source 43 for applying a driving voltage to the semiconductor laser device 21 and a monitor photodiode 41 mounted adjacent to the semiconductor laser device 21 for receiving the light from the semiconductor laser device 21.

With the laser light adjustment circuit 42, the laser control power source 43 is responsive to a detection signal from the phototransistor 44 to adjust the driving current supplied to the semiconductor laser device 21 to an appropriate value for appropriately adjusting the volume of light of the light beam radiated by the semiconductor laser device 21.

Also, with the laser light adjustment circuit 42, a connection line to the phototransistor 44 is grounded by a changeover switch 45 via two variable resistors 46, 47. Of these two variable resistors 46, 47, the variable resistor 46 is adjusted for providing an optimum emission light volume to the high density optical disc which is the second type optical disc. The variable resistor 47 is adjusted for giving an optimum emission light volume to the high-density optical disc which is the first type of the optical disc.

With the above arrangement, the changeover switch 45 is switched, under control by switching control means, not shown, depending on the type of the optical disc to be reproduced, whereby the semiconductor laser device 21 emits light with an optimum emission light volume appropriate for the type of the optical disc being reproduced.

The photodetector 27 is made up of a first light receiving unit 27a, a second light receiving unit 27b and a third light receiving unit 27c. The first light receiving unit 27a receives the central main beam of three beams split by the grating 22. On the other hand, the second and third light receiving units 27b, 27c receive both side beams of the three beams split by the grating 22.

The first light receiving unit 27a is separated into four light receiving segments A, B, C and D in the vertical and horizontal directions.

The light receiving segments A, B, C and D of the first light receiving unit 27a are delimited by a vertical splitting line and a horizontal splitting line. The vertical splitting line coincides with the direction perpendicular to the optical disc surface and is denoted by an arrow X in FIG. 14. The horizontal splitting line is formed in a direction at right angles with the vertical splitting line and is denoted by arrow Y in FIG. 14.

The second and third light receiving units 27b, 27c are split into light receiving segments E, F and G, H in the arraying direction of arrow Y in FIG. 14.

The first light receiving unit 27a, having the four light receiving segments A, B, C and D, split vertically and horizontally, represents the arrangement of the light receiving segments required for effecting focusing servo by the astigmatic method, while it represents the arrangement capable of generating tracking error signals for the second type disc by the phase comparison method as later explained.

The raising mirror 24 of FIGS. 3 and 4 is arranged relative to the photodetector 27 so that the reflecting surface thereof is at an angle of 45° with respect to the track direction (tangential direction) of the optical disc 11. Thus the optical axis of the light incident from the beam splitter 23 on the raising mirror 24 and the optical axis of the return light from the optical disc incident on the beam slitter 23 after reflection by the raising mirror 24 are inclined approximately 45 relative to the track direction (tangential direction) shown at L1 n FIG. 2 and deviated away from the spindle motor.

If it is assumed that the optical axis interconnecting a beam splitter 23-1 and the raising mirror 24 coincides with the track direction (tangential direction of the optical disc 11) as indicated by chain-dotted line in FIG. 5, a light beam passed through the inclined beam splitter 23-1 and thereby rendered astigmatic is incident on a photodetector 27-1.

The direction of the elliptical spot derived from a spot incident on a first light receiving unit 27a-1 by astigmatism is oriented in a direction shown in FIG. 5. For detecting the focusing error by the astigmatic method under this state, the light receiving segments A, B, C and D need to be formed in an X-pattern, as shown in the light receiving unit 27a-1. However, with the phase comparison method, one of the splitting lines needs be parallel to the tangential direction relative to the track. If the light receiving segments are split in the X-pattern as described above, tracking error signals cannot be generated by the phase comparison method for the second type disc given the direction of tracking movement Tr.

If the optical axis of the return light incident on the beam splitter 23 after reflection by the raising mirror 24 is inclined approximately 45° relative to the track direction shown at L1 in FIG. 2 (tangential direction of the optical disc 11), the orientation of the elliptical spot by astigmatism is varied, as shown by the first light receiving unit 27a of FIG. 5.

Thus, with the first light receiving unit 27a of the photodetector having vertical and horizontal splitting lines, it becomes possible to detect the focusing error by the astigmatic method and to detect the tracking error by the phase comparison method.

The detection signals from the light receiving segments A through to H in the photodetector 27 are current-voltage converted by operational amplifiers and formed by the above-mentioned error correction circuit 16 into tracking and focusing error signal which are inputted to the servo circuit 19.

The tracking error signal and the focusing error signal are generated by the error correction circuit 16 depending on the disc type in the following manner, For a first type optical disc, a focusing error signal FCS is calculated by adders 49, 50 and a subtractor 51, based on the astigmatic method, in accordance with the following equation:

FCS=(Sa+Sc)−(Sb+Sd)

from detection signals Sa, Sb, Scand Sd produced from the light receiving segments A, B, C and D of the first light receiving unit 27a, receiving the man light beam, respectively.

For the first type of the optical disc, a tracking error signal TRK1 is calculated by adders 52, 53 and a subtractor 54, based on the three-spot method, in accordance with the following equation:

TRK1=(Se+Sf)−(Sg+Sh)

from detection signals Se, Sf, Sg and Sh from the light receiving segments E and F of the second light receiving unit 27b and the light receiving segments G and H of the third light receiving unit 27c receiving the side light beams.

For a second type high-density optical disc, a focusing error signal FCS is calculated by the adders 49, 50 and the subtractor 51, based on the astigmatic method, in accordance with the following equation:

FCS=(Sa+Sc)−(Sb+Sd)

from detection signals Sa, Sb, Sc and Sd produced from the light receiving segments A, B, C and D of the first light receiving unit 27a, receiving the main light beam, respectively.

The tracking error signal TRK2 for the second type disc cannot be obtained with the three-spot method in the same way as with the first type disc because of the narrow spacing between the recording tracks and the high recording density. Thus the output signal (Sa+Sb) of the adder 49 and the output signal (Sb+Sd) of the adder 50 are phase-compared with each other by a phase comparator 55 for deriving the tracking error signal TRK2 from the detection signals Sa, Sb, Sc and Sd from the light receiving segments A, B, C and D of the light receiving unit 27a.

FIG. 16 illustrates the phase comparison method as the tracking error detection method. In FIG. 16, a vertical column a-1 denotes the state in which the spot S1 of the light beam (main beam) is on-track on a pit P on the signal recording surface of the optical disc, while a vertical column a-2 on the left side of the center column a-1 denotes the state in which the spot S1 is de-tracked towards right.

The right column a-3 on the right side of the center column a-1 denotes the state in which the spot S1 is de-tracked towards left.

The P in each vertical column shows the state of movement from below towards above of the vertical column relative to the spot S1, while the spots S2 shown towards the lateral side of the spot S1 on the signal recording surface specifies, as a shaded portion, a dark portion of a spot formed on the spilt light receiving segments of FIG. 16B.

Figure 16A:
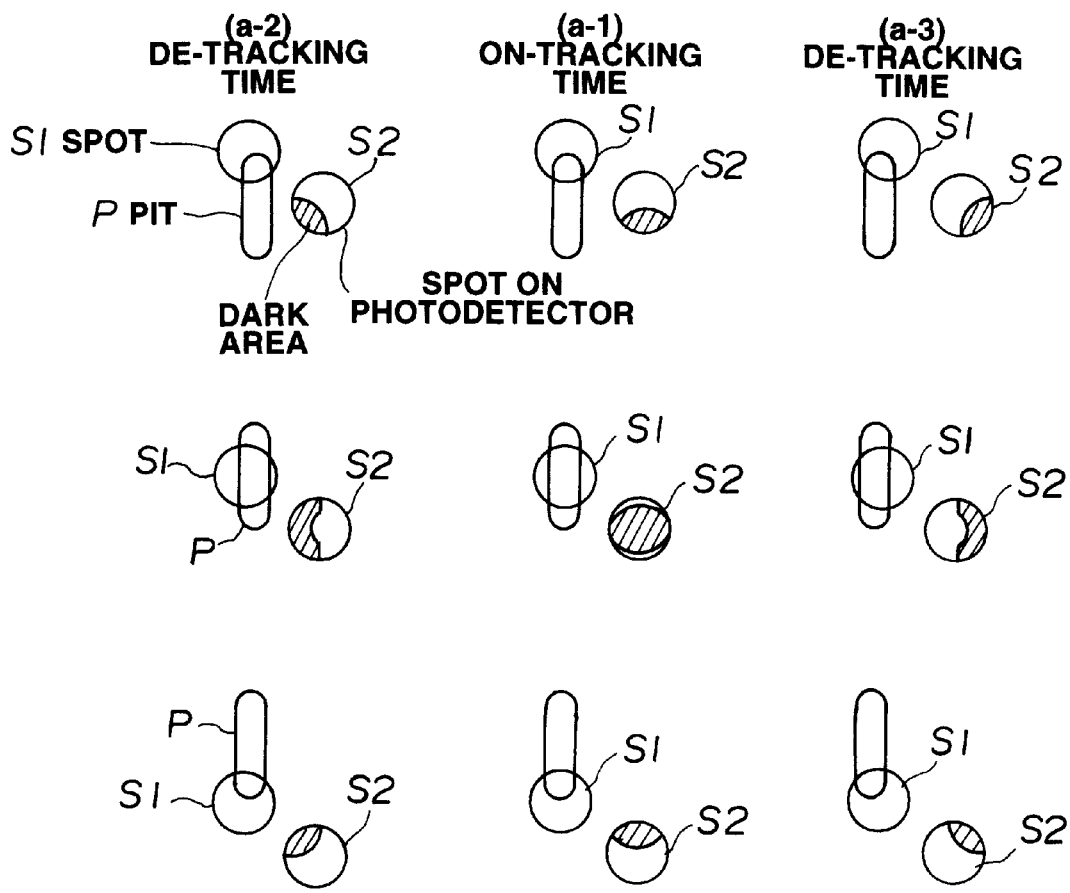
FIGS. 16A and 16B illustrate the principle of detection of tracking errors in the optical pickup embodying the present invention.
Figure 16B:
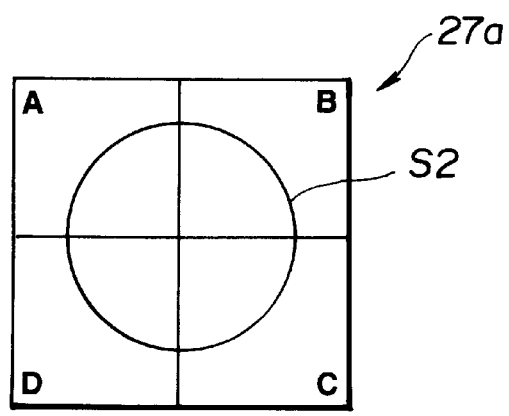

On the left-hand side vertical column a-2 of FIG. 16A, the spot S1 is de-tracked towards the left side of the pit P. Since the dark portion of the spot S2 first appears on the lower left side, an output signal (Sb+Sd) of the adder 50 associated with the spilt light receiving segments B and D shown in FIG. 16B is lowered. The output signal (Sa+Sc) then is also lowered. That is, since the output signal (Sb+Sd) is varied temporally before the output signal (Sa+Sc), the output signal (Sb+Sd) is advanced in phase relative to the output signal (Sa+Sc).

Conversely, on the right-hand side vertical column a-3 of FIG. 16A, the spot S1 is de-tracked towards the right side of the pit P. That is, since the output signal (Sb+Sd) is varied temporally before the output signal (Sa+Sc), the output signal (Sa+Sc) is advanced in phase with respect to the output signal (Sb+Sd).

The phase comparator circuit 55 of FIG. 15 phase-compares the output signal (Sa+Sc) of the adder 49 to the output signal (Sb+Sd) of the adder 50 in accordance with the above-described principle for generating the tracking error signal TRK2.

The phase comparator circuit 55 detects the rising and decay of the sum signals (Sa+Sc) and (Sb+Sd) and sample-holds these signal at the timings of the rising and decay in order to take the difference of the sample-held signals to generate a tracking error signal. However, any optional structure of the phase comparator circuit may be used without limitations.

If the detected signal is lowered in level, large noise tends to be mixed into defect portions. In order to prevent this from occurring, an in-phase bias signal may be added to the two signals (Sa+Sc) and (Sb+Sd) to be phase-compared to each other.

The switching of the tracking error signal detection method between the above-mentioned three-spot method and the phase comparison method is made based on the result of decision the type of the optical disc to be reproduced.

Figure 17:
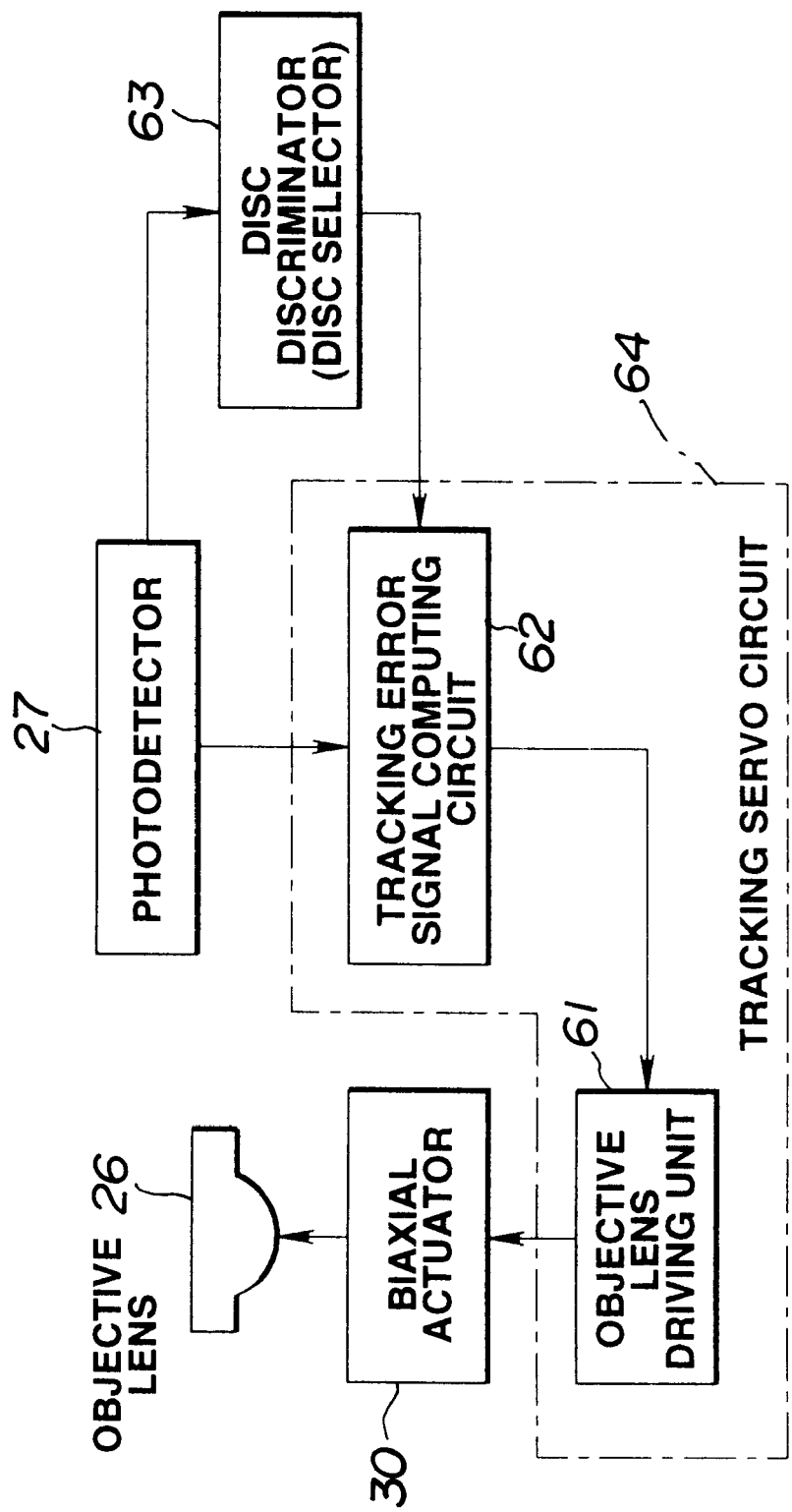
FIG. 17 is a block diagram showing a structure for producing different tracking errors based on decision of optical disc type in the optical pickup embodying the present invention.

FIG. 17 shows, in a block diagram, an arrangement for producing different tracking error signals based on the result of decision of the disc types.

In FIG. 17, the objective lens 26 is moved slightly in the tracking direction by the biaxial actuator 30. The bi-axial actuator 30 is driven by a tracking servo circuit 64. This tracking servo circuit 64 forms part of the servo circuit 19 of FIG. 1 and includes a computing circuit 62 for computing the tracking error signal and a driving circuit 16 for driving the objective lens. The computing circuit 62 is responsive to the instructions from a disc discriminating unit 63 as a selecting unit to select the computing unit for the three-spot method or the phase comparison method for computing the tracking error signals by the computing units for supplying the computed tracking error signal to the objective lens driving unit 61.

The disc discriminating unit 63 decides whether the optical disc to be reproduced is the first type optical disc or the second type optical disc and instructs the computing circuit 62 to compute the tracking error signal responsive to the disc types.

Specifically, the disc discriminating unit 63 is given the read-out result of the ID of the optical disc then set from the photodetector 27 or the disc discrimination detector, not shown, for determining whether the disc is the first type disc or the second type disc. Alternatively, the disc discriminating unit 63 acquires the readout result of the optical disc ID then set from the other photodetector 27 or from another disc discrimination detector, not shown, for giving judgment as to whether the optical disc is the first sort of the optical disc or the second sort of the optical disc. Alternatively, the disc discriminating unit 63 acquires the result of detection based on the difference of the reflected light volume derived from the difference in the reflected light volume caused by the difference in the difference of the thickness of the optical disc then set for measuring the number of tracks of the optical disc for outputting the measured result to the disc discriminating unit 63 for giving a judgment as to the optical disc type. The disc discriminating unit 63 discriminates the optical disc type and outputs the result of judgment to the computing circuit 62 for computing tracing error signals in order to determine the optical disc type.

Instead of relying on the discrimination by the disc discriminating unit 63 as to decision of the type of the optical disc then set, the user may select an operator as the selecting unit 62 in order to give the information on the type of the optical disc he or she has set to the computing circuit 62 for the tracking error.

The optical disc apparatus, having the optical pickup of the above-described structure built therein, operates as follows:

For reproducing the high-density optical disc, as the second type optical disc, the lens holder 33 is at the first neutral point position, as shown in FIG. 2, with the iron piece 41 mounted on the lens holder 33 facing the boundary 39c of the tracking magnet 39, with the objective lens 26a being introduced into the optical path.

If now the spindle motor 12 of the optical disc apparatus 10 is run in rotation, the optical disc 11 is run in rotation. The optical pickup 20 is moved along the guide 28 radially of the optical disc 11 for moving the optical axis of the objective lens 26a to a desired track position on the optical disc 11 for accessing.

The light beam from the semiconductor laser element 21 is split by the grating 22 into three light beams which are then reflected by the reflecting surface 23a of the beam splitter 23 so as to be reflected towards the optical disc 11 by the raising mirror 24. The optical beams are then collimated by the collimator lens 25 into collimated light which is then directed by the objective lens 26a towards the signal recording surface of the optical disc 11 for forming an image thereon.

The objective lens 26a has its numerical aperture set to a value matched to the high-density optical disc, such as NA=0.6, so that the light beam forms a correct image on the signal recording surface of the optical disc 11.

The return light reflected back by the optical disc 11 is again transmitted through the objective lens 26a, collimator lens 25 and the raising mirror 24 so as to fall on the photodetector 27. This reproduces the recorded signals of the optical disc 11 based on the detection signals of the photodetector 27.

On the other hand, if the return light reflected by the optical disc 11 is incident on the photodetector 27, the tracking error is detected by the signal demodulator 15 by the phase comparison method as shown in FIG. 15 based on the detection signals from the light receiving segments of the first light receiving unit 27a of the photodetector 27, while the focusing signal is reproduced by the astigmatic method.

The servo circuit 19 then servo-controls the driving current to the focusing coil 34 and the tracking coil 35 via optical disc driving controller 14. By controlling the driving current to the focusing coil 35 in this manner, the magnetic field generated in the focusing coil 35 coacts with the magnetic field generated by the focusing magnet 37 and the focusing coil 36 for adjusting movement of the lens holder 33 in the focusing direction along the supporting shaft 32 by way of performing the focusing.

On the other hand, the magnetic field generated in the tracking coil 35 coacts with the tracking magnet 39 and the tracking yoke 38 for oscillating the lens holder 33 about the supporting shaft 32 with the first neutral point position as the reference for moving the objective lens 26a in the tracking direction, which is substantially the tangential direction, by way of performing tracking servo.

For reproducing the second type optical disc, the center light beam of the free light beams split by the grating is used for detecting the focusing error signals, tracking error signals and the recording signals on the optical disc 11, while the side beams are not used.

For reproducing the first type optical disc, such as CD, the current larger than that used for usual tracking servo is caused to flow in the tracking coil 35 in a direction indicated by arrow L in FIG. 11. This causes the lens holder 33 to be rotated about the supporting shaft 32 to the second neutral point position so that the opposite side iron piece 40 mounted on the lens holder 33 faces the boundary 39c of the tracking coil 39, thus inserting the objective lens 26b into the optical path.

The spindle motor 12 of the optical disc apparatus is rotated in the manner similar to the case of reproducing the second type optical disc for running the optical disc 11 in rotation. The optical pickup 20 is moved along the guide 28 in the radial direction of the optical disc 11 for moving the optical disc of the objective lens 26b to the desired track position on the optical disc 11 for accessing.

In this state, the light beam from the semiconductor laser element 21 is divided by the grating 22 into three light beams which are then reflected by the reflecting surface 23a of the beam splitter 23 so as to be reflected towards the optical disc 11. The light beam is then converted by the collimator lens 25 into collimated light so as to form an image via the objective lens 26b on the signal recording surface of the optical disc 11.

The objective lens 26b has its numerical aperture set to a value matched to the first type optical disc, such as to NA=0.45, so that the light beam forms a correct image on the signal recording surface of the optical disc 11.

The return light reflected back by the optical disc 11 is again transmitted through the objective lens 26b, collimator lens 25 and the raising mirror 24 so as to fall on the photodetector 27. This reproduces the recorded signals of the optical disc 11 based on the detection signals of the photodetector 27.

The return light reflected by the optical disc 11 is transmitted via objective lens 26b, collimator lens 25 and raising mirror 24 to fall on the photodetector 27. The recording signal on the optical disc 11 are reproduced based on the detection signals of the photodetector 27.

The focusing error signal and the tracking error signal are detected from the detection signals of the light receiving elements 27a, 27b and 27c by the signal demodulator 15. Specifically, the focusing error signal is detected by the astigmatic method based on the detection signal produced by the light receiving unit 27a, while the tracking error signal is detected by the three-spot method based on the detection signal produced by the light receiving units 27b and 27c.

The servo circuit 19 servo-controls the driving current to the focusing coil 34 and to the tracking coil 35 via optical disc driving controller 14.

By controlling the driving current to the focusing magnet 35 in this manner, the magnetic field generated in the focusing coil 35 co-acts with the magnetic field generated by the focusing magnet 37 and the focusing coil 36 for moving the lens holder 33 in a controlled manner in the focusing direction along the supporting shaft 32 by way of focusing.

On the other hand, the magnetic field generated by the tracking coil 35 co-acts with the magnetic field generated by the tracking magnet 39 and the tracking yoke 38 for moving the lens holder 33 in a controlled manner about the supporting shaft 32 with the second neutral point position as a reference so that the objective lens 26a is moved in a controlled manner in the tracking direction, which is the tangential direction, by way of performing tracking.

In the above-described embodiment, in which the raising mirror 24 of the optical pickup 20 is arranged at an angle of 45° relative to the tracking direction of the optical disc, the tracking error signal and the focusing error signal are derived by the phase comparison method and by the astigmatic method based on the signals from the longitudinally and transversely divided four light receiving segments of the first photodetector 27

Although a biaxial actuator in which the objective lenses 26a, 26b are selectively switched responsive to the type of the optical disc has been described in the foregoing, the above-described method focusing error detection and tracking error detection can be applied to the case of using a sole light condensing means exploiting shutter means controlling the numerical aperture or the hologram.

In the above-described embodiment of the optical disc 10 and the optical pickup 20, the magnetic poles 39a, 39b are polarized to S and N, respectively. However, the magnetic poles 39a, 39b may be polarized to the opposite polarities. If, in this case, the direction of the current flowing in the tracking coil 35 is reversed, tracking occurs with the lens holder 33 being at first and second neutral point positions.

In the above-described embodiments of the optical disc device 10 and the optical pickup 20, the two objective lenses 26a, 26b are held by the lens holder 33. This, however, is merely illustrative, such that, for example, three or more objective lenses for high recording density optical discs may be held by the lens holder 33, with these objective lenses being selectively inserted into the optical path by the interaction between the tracking coil 35 and the tracking magnet 39. Alternatively, a sole objective lens for the high recording density optical disc may be held by the lens holder 33.

What is claimed is:

1. An optical pickup device comprising:

a light source for radiating a light beam;

a light splitting element for splitting the light beam into at least three light beam portions;

a optical path bending mirror for bending optical paths of said light beam portions;

an objective lens for focusing the light beam portions from said optical path bending mirror onto a signal recording surface of said optical disc;

a biaxial actuator for supporting said objective lens and for selectively moving said objective lens in at least one of a focusing direction and a tracking direction relative to said optical disc;

light splitting means for separating the light beam portions focused on the signal recording surface from return light beam portions reflected from the signal recording surface, the return light beam portions having optical paths bent by said optical path bending mirror; and a photodetector having three light receiving elements for receiving the return light beam portions, wherein optical paths from said light splitting means to said optical path bending mirror are set at an angle of approximately 45° relative to a direction of a recording track of the optical disc, and wherein said photodetector is configured and arranged such that:

during reproduction of an optical disc having a first recording density, the photodetector detects focusing error signals using the light receiving element disposed at the center of said three light receiving elements and detects tracking error signals using the remaining two light receiving elements of said three light receiving elements, and during reproduction of an optical disc having a second recording density, higher than the first recording density, the photodetector detects focusing error signals and tracking error signals using the light receiving element disposed at the center of said three light receiving elements.

2. The optical pickup device as claimed in claim 1 wherein at least one light receiving element of the three light receiving elements is split into four light receiving segments by two splitting lines of which one is oriented parallel to the arraying direction of said three light receiving elements and the other is oriented normal to the signal recording surface of the optical disc.

3. The optical pickup device as claimed in claim 2 wherein two of the three light receiving elements are split into two light receiving segments.

4. The optical pickup device as claimed in claim 2 wherein, during reproduction of an optical disc having the first recording density, said photodetector detects focusing errors by an astigmatic method using said center light receiving element and detects tracking errors based on the difference in the position of a light spot using each of the remaining two light receiving elements of said three light receiving elements.

5. The optical pickup device as claimed in claim 2 wherein, during reproduction of an optical disc having the first recording density, said photodetector detects focusing errors by an astigmatic method using said center light element and detects tracking errors based on a phase difference in the split light receiving segments of the center light receiving element.

6. The optical pickup device as claimed in claim 1 wherein said biaxial actuator supports a pair of objective lenses having different numerical apertures, said biaxial actuator switching between said pair of objective lenses depending on the recording density of the optical disc being reproduced for positioning the selected objective lens in an optical path.

7. The optical pickup device as claimed in claim 1 wherein said light splitting means comprises a plate-shaped optical element and acts as a beam splitter for reflecting a light beam radiated from said light source towards the optical disc and for transmitting a light beam reflected by the signal recording surface of the optical disc, the light beam reflected by the signal recording surface having an optical path bent by said optical path bending mirror.

8. The optical pickup device as claimed in claim 1 wherein said light splitting element comprises a grating element arranged between said light source and said light splitting means.

9. An optical pickup device comprising:

a light source for radiating a light beam;

a light splitting element for splitting the light beam into at least three light beam portions;

an optical path bending mirror for bending optical paths of said light beam portions;

an objective lens for focusing the light portions from said optical path bending mirror onto a signal recording surface of said optical disc;

a biaxial actuator for supporting said light path bending mirror and for moving said optical disc in at least one of a focusing direction and a tracking direction relative to said optical disc;

light splitting means for separating the light beam portions focused on the signal recording surface from return light beam portions reflected from the signal recording surface and having optical paths bent by said optical path bending mirror; and a photodetector having three light receiving elements for receiving the return light beam portions, the center light receiving element of said three light receiving elements being divided into at least four segments by a first splitting line parallel to the signal recording surface and a second splitting line normal to said first splitting line and the signal recording surface, wherein the optical path from the light splitting means to said optical path bending mirror is set at an angle of approximately 45° relative to a recording direction of the optical disc, wherein said photodetector detects the focusing error using an astigmatic method and detects the tracking error based on a phase difference of a detection output in the four light receiving segments in said center light receiving element, and wherein said photodetector is configured and arranged such that:

during reproduction of an optical disc having a first recording density, the photodetector detects focusing error signals using the light receiving element disposed at the center of said three light receiving elements and detects tracking error signals using the remaining two light receiving elements of said three light receiving elements, and during reproduction of an optical disc having a second recording density, higher that the first recording density, the photodetector detects focusing error signals and tracking error signals using the light receiving element disposed at the center of said three light receiving elements.

10. The optical pickup device as claimed in claim 9 wherein said biaxial actuator supports a pair of objective lenses having different numerical apertures, said biaxial actuator switching between said pair of objective lenses depending on a recording density of the optical disc being reproduced for positioning the selected objective lens in an optical path.

11. The optical pickup device as claimed in claim 9 wherein said light splitting means comprises a plate-shaped optical element and acts as a beam splitter that reflects the light beam portions focused towards the optical disc and transmits the return light beam portions reflected by the signal recording surface, the return light beam portions optical paths bent by said optical path bending mirror.

12. The optical pickup device as claimed in claim 9, wherein said light splitting element comprises a grating element for splitting the light beam radiated from said light source to the optical disc into said at least three light beam portion.

13. An optical disc device for recording and/or reproducing signals on or from an optical disc comprising:

driving means for rotationally driving an optical disc;

discriminating means for discriminating optical disc types having different recording densities;

an optical pickup for radiating a light beam to record and read out the signals from the optical disk;

transfer means for transferring the optical disc device along a radius of the optical disc;

a light source in said optical pickup for radiating the light beam;

a light splitting element for splitting the light beam into at least three light beam portions;

an optical path bending mirror for bending optical paths of said light beam portions;

an objective lens for focusing the light beam portions from said optical path bending mirror onto a signal recording surface of said optical disc;

a biaxial actuator for supporting said objective lens and for selectively moving said objective lens in at least one of a focusing direction and a tracking direction relative to said optical disc;

light splitting means for separating the light beam portions focused on the signal recording surface from return light beam portions reflected from the signal recording surface, the return light beam having an optical path bent by said optical path bending mirror; and a photodetector having three light receiving elements for receiving the return light beam portions, wherein optical paths from said light splitting means to said optical path bending mirror are set at an angle of approximately 45° relative to a direction of a recording track of the optical disc, and wherein said photodetector is configured and arranged such that:
during reproduction of an optical disc having a first recording density, the photodetector detects focusing error signals using a light receiving element disposed at the center of said three light receiving elements and detects tracking error signals using the remaining two light receiving elements of said three light receiving elements, and during reproduction of an optical disc having a second recording density, higher than the first recording density, the photodetector detects focusing error signals and tracking error signals using the light receiving element disposed at the center of said three light receiving elements.

14. The optical disc device as claimed in claim 13 wherein at least one light receiving element of the three light receiving elements is split into four light receiving segments by two splitting lines of which one is oriented parallel to the arraying direction of said three light receiving elements and the other is oriented normal to the signal recording surface of the optical disc.

15. The optical disc device as claimed in claim 14 wherein two of the three light receiving elements are split into two light receiving segments.

16. The optical disc device as claimed in claim 14 wherein, during reproduction of an optical disc having the first recording density, said photodetector detects focusing errors by an astigmatic method using said center light receiving element and detects tracking errors based on the difference in the position of a light spot in each of the remaining two light receiving elements of said three light receiving elements.

17. The optical disc device as claimed in claim 14 wherein, during reproduction of an optical disc having the first recording density, said photodetector detects focusing errors by an astigmatic method using said center light receiving element and detects tracking errors based on a phase difference in the split light receiving segments of the center light receiving element.

18. The optical disc device as claimed in claim 13 wherein said biaxial actuator supports a pair of objective lenses having different numerical apertures, said biaxial actuator switching between said pair of objective lenses depending on the recording density of the optical disc being reproduced for positioning the selected objective lens in an optical path.

19. The optical disc device as claimed in claim 13 wherein said biaxial actuator switches between said objective lenses based on a discrimination output of said discrimination means.

20. The optical disc device as claimed in claim 13 wherein said light splitting means comprises a plate-shaped optical element and acts as a beam splitter for reflecting a light beam radiated from said light source towards the optical disc and for transmitting a light beam reflected by the signal recording surface of the optical disc, the light beam reflected by the signal recording surface having an optical path bent by said optical path bending mirror.

21. The optical disc device as claimed in claim 13 wherein said light splitting element comprises a grating element arranged between said light source and said light splitting means.

22. The optical disc device as claimed in claim 13 wherein said photodetector is controlled by a discrimination output of said discrimination means for switching tracking error detection methods.

23. An optical disc device for recording and/or reproducing signals on or from an optical disc comprising:

driving means for rotationally driving an optical disc;

discriminating means for discriminating optical disc types having different recording densities;

an optical pickup for radiating a light beam to record and read out the signals from the optical disc, said optical pickup including:
a light source for radiating a light beam;
a light splitting element for splitting the light beam radiated from said light source into at least three light beam portions; and
a photodetector having three light receiving elements for receiving return light beam portions reflected from a signal recording surface on said optical disc, wherein said photodetector is configured and arranged such that:
during reproduction of an optical disc having a first recording density, the photodetector detects focusing errors using the light receiving element disposed at the center of said three light receiving elements and detects tracking error signals using the remaining two light receiving elements of said three light receiving elements, and
during reproduction of an optical disc having a second recording density, higher than the first recording density, the photodetector detects focusing errors and tracking errors using the light receiving element disposed at the center of said three light receiving elements;

transfer means for transferring the optical disc device along a radius of the optical disc;

a focusing error detection circuit for generating focusing error signals based on the return light beam portions detected by said optical pickup;

a first tracking error detection circuit for generating a tracking error signal based on the return light beam portions detected by said optical pickup;

a second tracking error detection circuit for generating a tracking error signal based on the return light beam portions detected by said optical pickup; and control means for selecting one of said first tracking error detection circuit and said second tracking error detection circuit as a function of whether the optical disc being reproduced has the first or the second recording density for selectively using the selected tracking error detection circuit.

24. The optical disc device as claimed in claim 23 wherein said optical pickup further comprises:

an optical path bending mirror for bending optical paths of said light beam portions split by said light splitting element;

an objective lens for radiating the light beam portions from said optical path bending mirror to focus the split light beams on the signal recording surface of said optical disc;

a biaxial actuator for supporting said light path bending mirror and for moving said optical disc in at least one of a focusing direction and a tracking direction relative to said optical disc;

light splitting means for separating the light beam portions focused on the signal recording surface from return light beam portions having optical paths bent by said optical path bending mirror, wherein the light receiving element disposed at the center of said three light receiving elements in said photodetector is divided into at least four segments by a first splitting line parallel to the signal recording surface and a second splitting line normal to said first splitting line and the signal recording surface, wherein optical paths from the light splitting means to said optical path bending mirror are set at an angle of approximately 45° relative to a recording direction of the optical disc, and wherein said photodetector detects a focusing error using the astigmatic method based on a detection by said four light receiving segments in said light receiving element and wherein said photodetector detects a tracking error based on a phase difference of a detection output in the four light receiving segments in said light receiving element.

25. The optical disc device as claimed in claim 24, wherein the light receiving elements on either side of the center light receiving element are split into two light receiving segments.

26. The optical disc device as claimed in claim 24 wherein said biaxial actuator supports a pair of objective lenses having different numerical apertures, said biaxial actuator switching between said pair of objective lenses depending on a recording density of the optical disc being reproduced for positioning the selected objective lens in an optical path.

27. The optical disk device as claimed in claim 24, wherein said light splitting element is a grating element for splitting the light beam radiated from said light source to the optical disc into said at least three optical beam portions.

28. The optical disc device as claimed in claim 23 wherein said disc discriminating means discriminates the optical disc type based on the return light beam portions detected by said optical pickup.

29. The optical disc device as claimed in claim 23 wherein tracking error signals in a first type of optical disc having a first recording density are detected by said first tracking error detection circuit and tracking error signals in a second type optical disc having a second recording density higher than the first recording density are detected by said second tracking error detection circuit.

* * * * *